United States Patent
Tian et al.

(10) Patent No.: US 7,057,149 B2
(45) Date of Patent: Jun. 6, 2006

(54) METHOD AND SYSTEM FOR CONTROLLING A SECONDARY AMPLIFIER WITH A PRIMARY AMPLIFIER IN AN OPTICAL NETWORK

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 10/648,941

(22) Filed: Aug. 26, 2003

(65) Prior Publication Data

US 2005/0045810 A1 Mar. 3, 2005

(51) Int. Cl.
*H01J 43/00* (2006.01)
(52) U.S. Cl. .................... 250/214 LA; 359/341.41
(58) Field of Classification Search ......... 250/214 AG, 250/214 LA; 359/341.4–341.44, 341.3
See application file for complete search history.

(56) References Cited

U.S. PATENT DOCUMENTS

| 5,050,949 | A | 9/1991 | DiGiovanni et al. ..... 359/337.4 |
| 5,506,724 | A | 4/1996 | Shimizu et al. ........ 359/341.41 |
| 5,539,563 | A | 7/1996 | Park ........................... 398/148 |
| 5,764,404 | A | 6/1998 | Yamane et al. ......... 359/337.12 |
| 5,831,754 | A | 11/1998 | Nakano ..................... 398/158 |
| 6,198,572 | B1 | 3/2001 | Sugaya et al. ............... 359/337 |
| 6,307,670 | B1 | 10/2001 | McNamara ............ 359/341.33 |
| 6,342,965 | B1 | 1/2002 | Kinoshita .................... 359/334 |
| 6,535,330 | B1 | 3/2003 | Lelic et al. ............ 359/337.13 |
| 6,661,570 | B1 * | 12/2003 | Nakaji .................... 359/341.41 |
| 6,671,085 | B1 * | 12/2003 | So et al. ................. 359/341.42 |
| 6,687,045 | B1 | 2/2004 | Lelic ....................... 359/337.1 |
| 6,690,505 | B1 | 2/2004 | Ye .............................. 359/337 |
| 6,690,508 | B1 | 2/2004 | Tian et al. ................ 359/341.4 |
| 2002/0075562 | A1 | 6/2002 | Youn et al. ............. 359/341.41 |
| 2004/0091206 | A1 * | 5/2004 | Denkin et al. ................. 385/27 |

FOREIGN PATENT DOCUMENTS

WO WO 01/80467 A1 10/2001

* cited by examiner

*Primary Examiner*—Thanh X. Luu
(74) *Attorney, Agent, or Firm*—Baker Botts L.L.P.

(57) ABSTRACT

A method for controlling an amplifier in an optical network includes determining primary pump power information for a primary amplifier and communicating the primary pump power information to a secondary amplifier coupled to the primary amplifier. The method also includes generating secondary pump control information for the secondary amplifier based on the primary pump power information and amplifying a first optical signal at the secondary amplifier based on the secondary pump control information.

12 Claims, 3 Drawing Sheets

METHOD AND SYSTEM FOR CONTROLLING A SECONDARY AMPLIFIER WITH A PRIMARY AMPLIFIER IN AN OPTICAL NETWORK

TECHNICAL FIELD OF THE INVENTION

The present invention relates generally to optical networks and, more particularly, to a method and system for controlling an amplifier in an optical network.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

Sustaining power levels of optical signals in optical networks presents substantial technical challenges. It is desirable for the power of the signals to be within a dynamic range of the receivers in an optical network, and the dynamic range of the receivers tends to be smaller for higher data rates. Nodes of optical networks thus may include one or more amplifiers to provide a desired amplification for optical signals. Each amplifier may include its own control circuit for control of the gain media within the amplifier.

SUMMARY OF THE INVENTION

The present invention provides a method and system for controlling an amplifier in an optical network that substantially eliminates or reduces at least some of the disadvantages and problems associated with previous amplifier control methods and systems.

In accordance with a particular embodiment of the present invention, a method for controlling an amplifier in an optical network includes determining primary pump power information for a primary amplifier and communicating the primary pump power information to a secondary amplifier coupled to the primary amplifier. The method also includes generating secondary pump control information for the secondary amplifier based on the primary pump power information and amplifying a first optical signal at the secondary amplifier based on the secondary pump control information.

The method may also include amplifying a second optical signal at the primary amplifier. The first optical signal and the second optical signal may comprise the same channels. The method may include measuring an input power of a third optical signal at the primary amplifier and measuring an output power of the third optical signal at the primary amplifier. Determining primary pump power information for a primary amplifier may comprise determining primary pump power information based on the input power and the output power. Generating secondary pump control information for the secondary amplifier based on the primary pump power information may comprise adjusting parameters of the primary pump power information. Adjusting parameters of the primary pump power information may comprise adjusting for a difference in relative gains of the primary amplifier and secondary amplifier and adjusting for a difference in relative power ratio of the primary amplifier and the secondary amplifier. The primary amplifier may comprise a pre-amplifier of an optical node, and the secondary amplifier may comprise a distributing amplifier of the optical node.

In accordance with another embodiment, a system for controlling an amplifier in an optical network includes a primary amplifier coupled to a secondary amplifier. The primary amplifier comprises automatic gain control circuitry operable to determine primary pump power information for the primary amplifier and to communicate the primary pump power information to the secondary amplifier. The secondary amplifier comprises tuning circuitry operable to generate secondary pump control information for the secondary amplifier based on the primary pump power information and gain medium operable to amplify a first optical signal based on the secondary pump control information.

The primary amplifier may comprise gain medium operable to amplify a second optical signal. The first optical signal and the second optical signal may comprise the same channels. Tuning circuitry operable to generate secondary pump control information for the secondary amplifier based on the primary pump power information may comprise tuning circuitry operable to adjust parameters of the primary pump power information.

Technical advantages of particular embodiments of the present invention include a method and system for controlling a secondary amplifier with a primary amplifier in an optical network. The implementation of such control reduces costs by reducing the number of optical components used in the optical network. The primary amplifier may share with the secondary amplifier information generated by the primary amplifier thus reducing the number of optical components needed in the secondary amplifier. Moreover, a control circuit of the secondary amplifier may be simpler as a result of the shared information.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
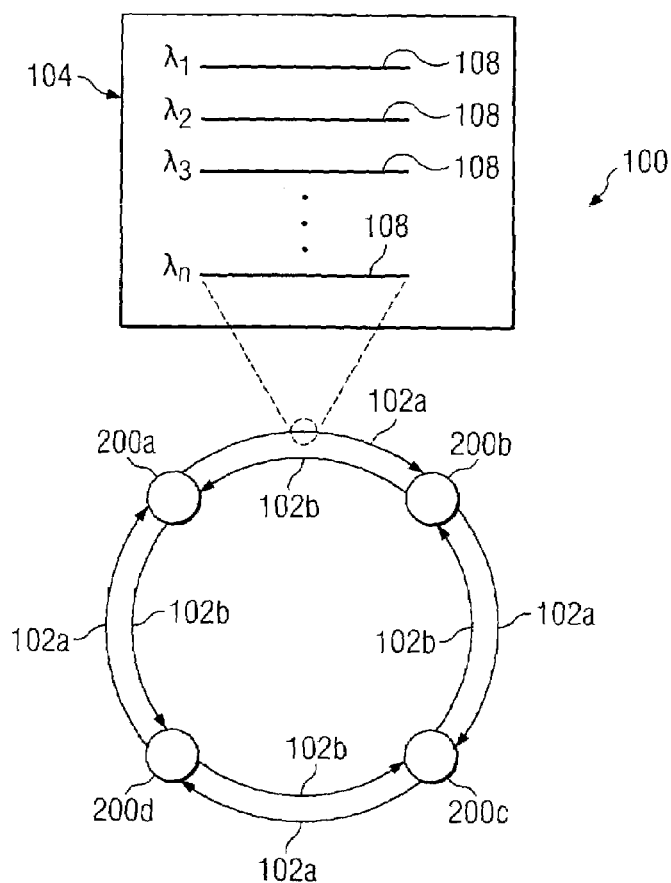
FIG. 1 illustrates an optical communication network with network nodes, in accordance with a particular embodiment of the present invention.

FIG. 1 shows an optical network 100 that communicates information between network nodes 200 using optical links 102. Optical network 100 generally represents any collection of hardware and/or software that communicates information between network nodes 200 in the form of optical signals. In a particular embodiment, optical network 100 uses wavelength division multiplexing (WDM) or dense wavelength division multiplexing (DWDM) to communicate information on multiple channels, each channel using a different wavelength. Network nodes 200, referring generally to nodes 200a, 200b, 200c and 200d, represent any hardware and/or software that receives information carried in optical network 100 in the form of optical signals, processes that information in any suitable fashion, and/or communicates information to optical network 100.

Nodes 200 are each operable to passively add and drop traffic to and from links 102. In particular, each node 200 receives traffic from local clients and adds that traffic to links 102. At the same time, each node 200 receives traffic from links 102 and drops traffic destined for the local clients. As used throughout this description and the following claims, the term "each" means every one of at least a subset of the identified items. In adding and dropping traffic, nodes 200 may combine data from clients for transmittal in links 102 and may drop channels of data from links 102 for clients. Traffic may be dropped by making the traffic available for transmission to the local clients. Thus, traffic may be dropped and yet continue to circulate on a link. Nodes 200 communicate the traffic on links 102 regardless of the channel spacing of the traffic—thus providing "flexible" channel spacing in nodes 200. "Passively" in this context means the adding or dropping of channels without power, electricity and/or moving parts. An active device would thus use power, electricity or moving parts to perform work. In a particular embodiment of the present invention, traffic may be passively added to and/or dropped from links 102 by splitting/combining, which is without multiplexing/demultiplexing, in the links and/or separating parts of a signal in the link. Nodes 200 may include optical switches, amplifiers such as erbium doped fiber amplifiers (EDFAs), optical-electronic converters or any other suitable hardware and/or software for processing optical signals.

Links 102 represent any suitable links for communicating optical signals 104 between network nodes 200. As such, links 102 may include any manner of optical communication medium, including optical fibers such as single-mode fiber, dispersion compensation fiber, dispersion-shifted fiber, non-zero dispersion shifted fiber. Links 102 may also include any other suitable optical components, such as EDFAs, repeaters, or optical-electronic-optical (OEO) converters. Links 102 may carry information using any suitable format or protocol, including frame relay, asynchronous transfer mode (ATM), synchronous optical network (SONET), or any other suitable method of communication. Links 102 may also perform any necessary signal and/or protocol conversion necessary to communicate information between nodes 200. Links 102 may be unidirectional or bidirectional. In many networks, there is an "eastbound" path traveling clockwise around optical network 100, and a "westbound" path, which communicates information counterclockwise around optical network 100. Each link 102 may include one or multiple optical fibers or other media for communicating optical signals 104, and nodes 200 of optical network 100 may be arranged in any suitable configuration, including rings, stars, or other suitable network configuration. In a particular embodiment, network 100 may be an Optical Unidirectional Path-Switched Ring (OUPSR) network in which traffic sent from a first node 200 to a second node 200 is communicated over both links 102. The use of such dual communication allows traffic to get from one node 200 to another over at least one link 102 in the event of a line break or other damage to the other of the links 102.

In a particular embodiment, links 102 carry optical signals 104 that have a wavelength spectrum of the form shown in FIG. 1. In signal 104, the optical information is apportioned in several different wavelengths 108. Each wavelength 108 represents a particular channel. Information carried on links 102 may be assigned to any particular wavelength 108 and optical signal 104. Using appropriate equipment, wavelengths 108 may be added, dropped, switched, or otherwise processed separately. Signal 104 may also include an optical supervisory channel (OSC) that represents one or more wavelengths assigned to carry information used for management of network 100. For example, the OSC may communicate status information for the channels 108 indicating whether each channel 108 is provisioned and whether there has been an error detected in communication of channel 108. Any number of wavelengths may be assigned to the OSC for carrying network management information.

Figure 2:
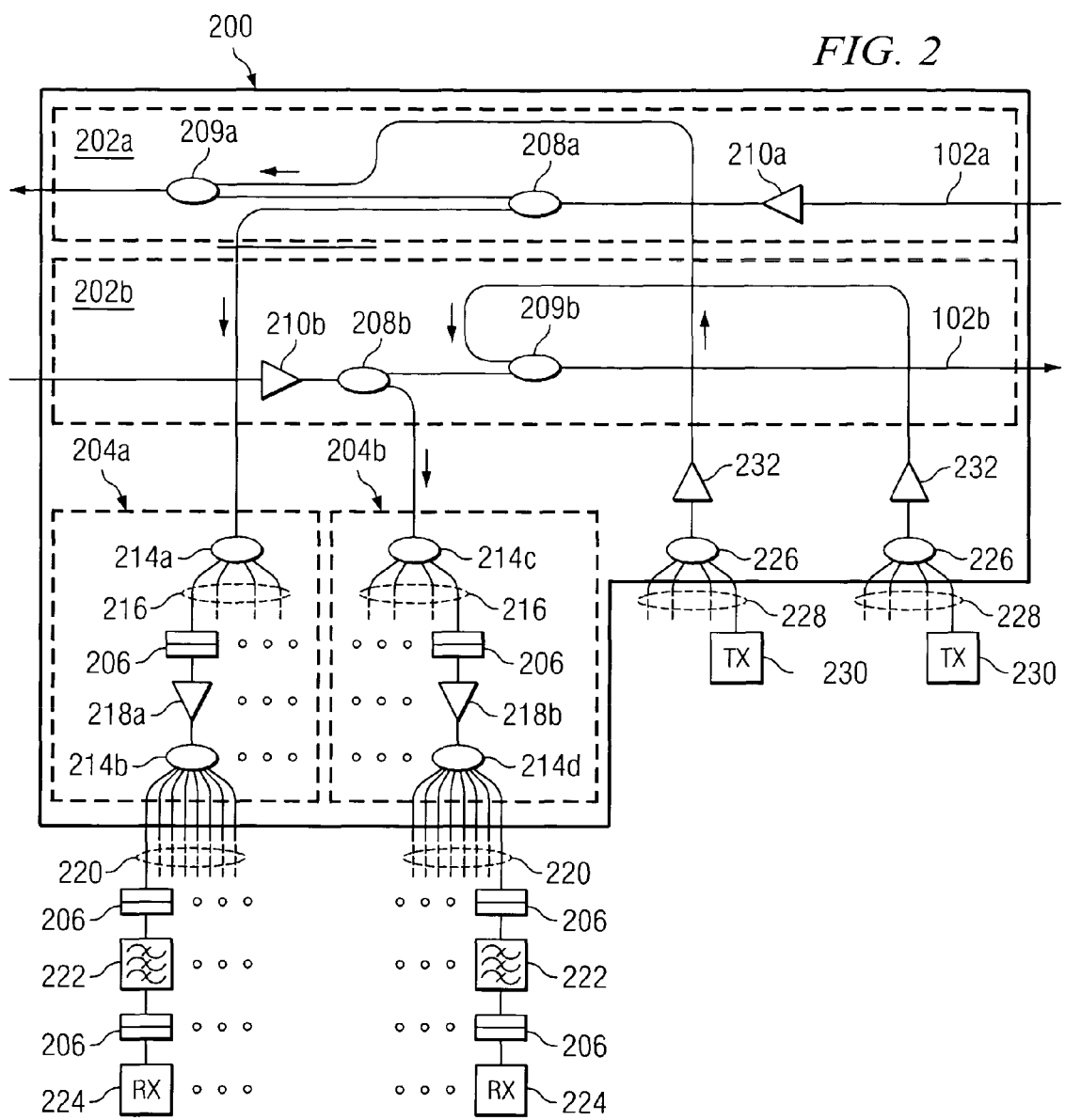
FIG. 2 illustrates particular details of a node of an optical network, in accordance with a particular embodiment of the present invention.

FIG. 2 is a block diagram illustrating particular details of a node 200 of FIG. 1, in accordance with an embodiment of the present invention. Referring to FIG. 2, node 200 includes counterclockwise transport element 202a, clockwise transport element 202b, counterclockwise distributing element 204a and clockwise distributing element 204b. In one embodiment, elements 202 and 204, as well as components within the elements may be interconnected with optical fiber links. Any other suitable connections may alternatively be used. In addition, the elements of node 200 may each be implemented as one or more discrete cards within a card shelf of node 200. Exemplary connectors 206 for a card shelf embodiment are illustrated in FIG. 2. Connectors 206 may allow efficient and cost effective replacement of failed components. It will be understood that additional, different and/or other connectors may be provided as part of node 200.

Transport elements 202 are positioned "in-line" on links 102. In the illustrated embodiments, transport elements 202 each comprise a drop coupler 208 and an add coupler 209 which allow for the passive dropping and adding, respectively, of traffic. Although couplers 208 and 209 are described, any other suitable optical splitters may be used. For the purposes of this description and the following claims, the terms "coupler," "splitter" and "combiner" should each be understood to include any device which receives one or more input optical signals and either splits or combines the input optical signal(s) into one or more output optical signals. Transport elements 202 further comprise primary amplifiers 210 which may comprise EDFAs or other suitable amplifiers. In the illustrated embodiment, primary amplifiers 210 act as pre-amplifiers for node 200. Transport elements 202 may also include OSC filters which may comprise thin film type, fiber grating or other suitable type filters.

Distributing elements 204 may each comprise drop signal splitters 214. Splitters 214 may comprise a coupler with one optical fiber ingress lead and a plurality of optical fiber egress leads which serve as drop leads 216. In the illustrated embodiment, each distributing element 204 includes distributing amplifiers 218 between in-line splitters (i.e., between splitters 214a and 214b of distributing element 204a and between splitters 214c and 214d of distributing element 204b) to increase, or boost, the optical signals communicated therethrough. In particular embodiments, amplifiers 218 may act as secondary amplifiers controlled by primary amplifiers 210 in a manner further discussed below.

In the illustrated embodiment, four drop leads 216 egress from each of splitters 214a and 214c. Thus, splitters 214a and 214c may each comprise a 2×4 optical coupler, where one ingress lead of each splitter is terminated, the other ingress lead of each splitter is coupled to couplers 208a and 208b, respectively, and the four egress leads from each splitter are used as drop leads 216. Splitters 214b and 214d may be configured in a similar manner to each include an ingress lead from amplifiers 218a and 218b, respectively, and eight egress drop leads 220. Although the illustrated embodiment shows four drop leads 216 from each splitter 214a and 214c and eight drop leads 220 from each splitter 214b and 214d, it should be understood that any appropriate number of drop leads 216 and 220 may implemented.

Drop leads 220 egressing from distributing elements 204 may be connected to one or more connectors 206 and one or more filters 222 which in turn may be connected to one or more drop optical receivers 224.

Combiners 226 similarly may comprise a coupler with multiple optical fiber ingress leads, which serve as add leads 228, and one optical fiber egress lead. The add leads 228 may be connected to one or more add optical transmitters 230. In particular embodiments in which four add leads 228 are implemented, combiners 226 may each comprise a 2×4 optical coupler, where one ingress lead is terminated, the other ingress lead is coupled to a coupler via a fiber segment, and the four egress leads are used as the add leads 228. Although the illustrated embodiment shows four add leads 228, it should be understood that any appropriate number of add leads 228 may be implemented. Amplifiers 232 are used to increase, or boost, the optical signals added to links 102a and 102b at add couplers 209.

In operation, the transport elements 202 are operable to passively add traffic to links 102 to passively drop traffic from links 102. The transport elements 202 may further be operable to passively add and drop the OSC signal to and from links 102.

Each coupler 208 passively splits the signal from the primary amplifier 210 to which it is coupled into two generally identical signals: a through signal that is forwarded through the network and a drop signal that is forwarded to the associated distributing element 204. The split signals are copies in that they are identical or substantially identical in content, although power and/or energy levels may differ. Each coupler 209 passively combines the through signal with an add signal comprising add traffic from the associated combiner 226. In particular embodiments, the combined signal may be forwarded from a coupler to an associated OSC egress filter.

Prior to being forwarded to couplers 208, locally-derived add traffic (from local clients or subscribers, from another network, or from any other appropriate source) is received at a combiners 226 from one or more of the optical transmitters 230. A separate optical transmitter 230 may be used for each wavelength/channel in which traffic is to be added at a node 200. Furthermore, each add lead 228 may be associated with a different wavelength/channel. Therefore, there may be an transmitter 230 and add lead 228 combination for each separate channel in which traffic is desired to be added at a particular node 200. Although four add leads 228 for each link 102 are illustrated (although four transmitters 230 are not explicitly illustrated), it will be understood that any appropriate number of optical transmitters 230 and associated add leads 228 may be used.

Add traffic from one or more transmitters 230 is received at the associated combiner 226. The combiner 226 combines the signals from multiple transmitters 230 (if applicable) and forwards the combined add signal to the associated amplifier 232 for amplification and then to coupler 209 for addition to the associated link 102. As described above, this add traffic is then combined with forwarded traffic at coupler 209. Combiner 226 may be a coupler, a multiplexer or any other suitable device.

As described above, locally-destined traffic on a link 102 is dropped to the associated distributing element 204 using coupler 208. The drop traffic is received at the splitter 214 of the distributing element 204, and the splitter 214 splits the dropped signal into multiple generally identical signals and forwards each signal to a amplifier 218 which may be controlled by an amplifier 210, as further discussed below. The traffic may be subsequently split by additional splitters 214 and forwarded to optical receivers 224. In particular embodiments, the signal received by optical receivers 224 may first be filtered by an associated filter 222. Filters 222 may be implemented such that each filter allows a different channel to be forwarded to its associated receiver 224. Filters 222 may be tunable filters (such as an acousto-optic tunable filter) or other suitable filters, and receivers 224 may be broadband receivers or other suitable receivers. Such a configuration allows each receiver 224 associated with a particular link 102 to receive a different wavelength, and to forward the information transmitted in that wavelength to appropriate clients. A dropped optical signal passing through a filter 222 is able to be optically forwarded to a client without signal regeneration if the signal does not require such regeneration.

As mentioned above, primary amplifiers 210 may control the operation of secondary amplifiers 218. The details of such control are described below with respect to FIGS. 3 and 4. The implementation of control of secondary amplifiers 218 using primary amplifiers 210 can reduce costs by reducing the number of optical components used in the optical network. For example, by sharing information generated by a primary amplifier 210, the number of optical components in a secondary amplifier 218 controlled by primary amplifier 210 may be reduced. Moreover, a control circuit of the secondary amplifier may be simpler.

Figure 3:
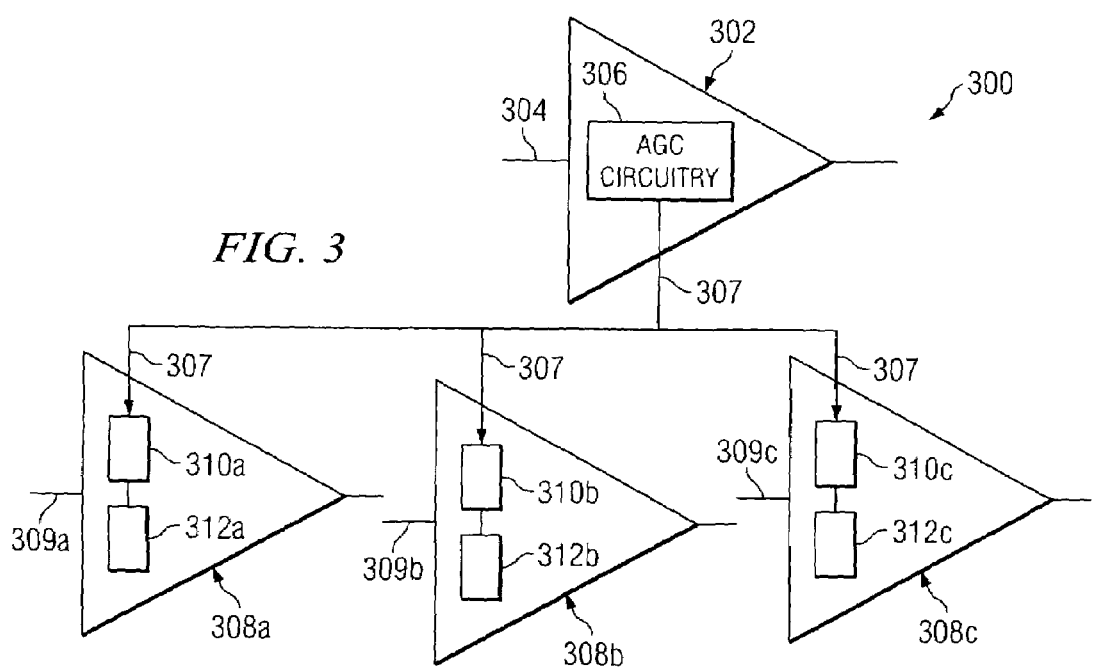
FIG. 3 illustrates a system for control of secondary amplifiers by a primary amplifier, in accordance with a particular embodiment of the present invention.

FIG. 3 illustrates a system 300 for control of secondary amplifiers by a primary amplifier. System 300 includes primary amplifier 302 and secondary amplifiers 308a–308c. Primary amplifier 302 controls secondary amplifiers 308a–308c by determining pump control information for secondary amplifiers 308–308c. In particular embodiments, the input optical signals to primary amplifier 302 and secondary amplifiers 308 controlled by primary amplifier 302 comprise the same channels in order to effectively implement such control. However, the average power of such channels may be different.

Primary amplifier 302 increases, or boosts, an optical signal communicated on optical link 304. Primary amplifier 302 includes AGC circuitry 306. AGC circuitry 306 determines the required pump power for primary amplifier 302 according to the following equation:

$$\text{Pump}_{primary} = a(g_{primary})P_{primary\text{-}In} + b(g_{primary}),$$

where $g_{primary}$ is a design criteria representing the gain of primary amplifier 302, $P_{primary\text{-}In}$ represents the input power to primary amplifier 302 and a and b are constants.

As discussed above, primary amplifier 302 controls secondary amplifiers 308a–308c. Each secondary amplifier 308 increases an optical signal communicated on a respective optical link 309. Each secondary amplifier 308 includes gain tuning circuitry 310 and power ratio tuning circuitry 312. AGC circuitry 306 of primary amplifier 302 controls gain tuning circuitry 310 and power ratio tuning circuitry 312 of each secondary amplifier 308 through a plurality of electrical links 307 connecting primary amplifier 302 to each secondary amplifier 308.

For each secondary amplifier 308, a similar relationship between required pump power and input power exists as such relationship for primary amplifier 302. For example, for each secondary amplifier 308, such relationship is represented by the following equation:

$$\text{Pump}_{secondary} = a(g_{secondary})P_{secondary\text{-}In} + b(g_{secondary}),$$

where $g_{secondary}$ is a design criteria representing the gain of the secondary amplifier 308, $P_{secondary\text{-}In}$ represents the input power to the secondary amplifier 308 and a and b are constants.

If the input power of primary amplifier 302 has a fixed relationship with the input power of each secondary amplifier 308, such condition represented by the following equation:

$$P_{primary\text{-}In} = aP_{secondary\text{-}In} + b,$$

then using the above equations, the following equation is derived:

$$\text{Pump}_{secondary} = A\text{Pump}_{primary} + B,$$

where A and B are the functions of the other constants a and b discussed above. Thus, the pump power required by each secondary amplifier 308 is linearly dependent on the pump power of primary amplifier 302, if the pump inputs for the primary and secondary amplifiers have a fixed relationship and the gain of primary amplifier 302 and secondary amplifiers 308 are fixed. The two constants A and B are dependent on the relative gain and input power ratio of the primary amplifier 302 and secondary amplifiers 308.

AGC circuitry 306 of primary amplifier 302 determines the pump power for the primary amplifier and transmits such information to each secondary amplifier 308. Gain tuning circuitry 310 and power ratio tuning circuitry 312 of each secondary amplifier 308 adjusts the gain and power ratio, respectively, of each secondary amplifier 308 to yield the pump power for each respective secondary amplifier 308. In particular embodiments, such adjustment may be made after initial setup or after system configuration changes. Because the power of the secondary amplifiers varies with the power of the primary amplifier, adjustment of secondary amplifier gain and power ratio is not required during operation after initial setup, even though $\text{Pump}_{primary}$ is dynamic. Gain tuning circuitry 310 may be implemented through operational amplifiers in particular embodiments, and power ratio tuning circuitry 312 may be implemented through a voltage divider.

Optical links 304 and 309 may comprise any type of link carrying optical signals. For example, in particular embodiments optical link 304 may comprise an optical ring and optical links 309 may comprise drop leads carrying optical traffic dropped from such optical ring.

AGC circuitry 306, gain tuning circuitry 310 and power ratio tuning circuitry 312 may comprise analog circuitry, digital circuitry embedded on a chip, logic embedded in media or other suitable circuitry. The logic comprises functional instructions for carrying out programmed tasks. The media comprises computer disks or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized.

Figure 4:
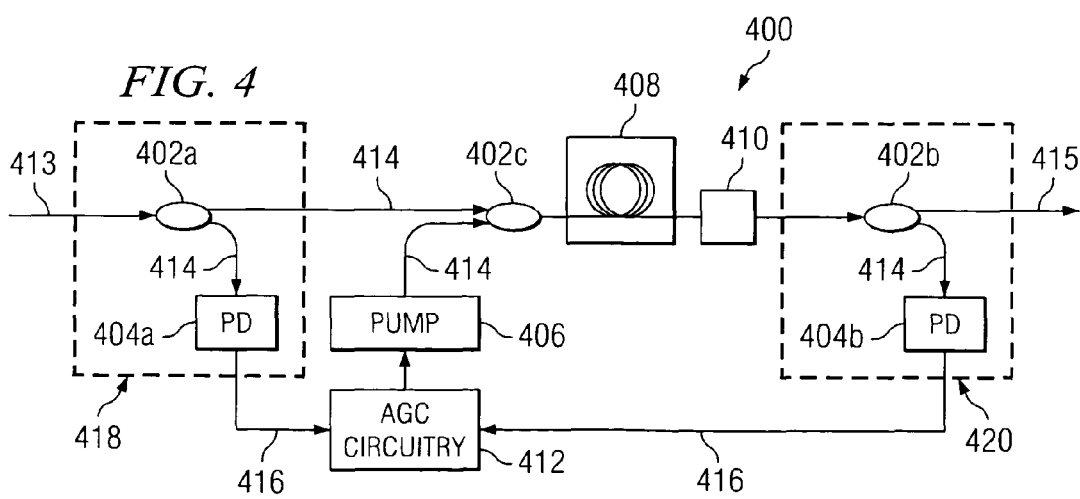
FIG. 4 illustrates particular details of a primary amplifier, in accordance with a particular embodiment of the present invention.

FIG. 4 illustrates certain details of a primary amplifier 400, in accordance with an embodiment of the present invention. In particular embodiments, the illustrated details of primary amplifier 400 may be utilized in primary amplifiers 210 of FIG. 2 or primary amplifier 302 of FIG. 3. Primary amplifier 400 includes optical couplers 402, photodetectors 404, an optical pump 406, a gain medium 408, a filter 410 and AGC circuitry 412. Optical amplifier 400 also includes a plurality of optical links, or fibers, 414 and electrical links 416 connecting the components.

Optical coupler 402a and photodetector 404a, both on an ingress side of gain medium 408, form an input monitor 418 while optical coupler 402b and photodetector 404b, both on an egress side of gain medium 408, form an output monitor 420. Input monitor 418 is operable to tap ingress optical fiber 413 to obtain an ingress optical signal, to measure a power of the ingress optical signal, and to generate an input power signal based on the power of the ingress optical signal. As described in more detail below, the input power signal is provided to AGC circuitry 412. Output monitor 420 taps an egress optical fiber 415 to obtain an egress optical signal, measures the power of the egress optical signal, and generates an output power signal based on the power of the egress optical signal. As described in more detail below, the output power signal is provided to AGC circuitry 412.

In input and output monitors 418 and 420, optical couplers 402 are each operable to split an incoming signal into discrete signals or otherwise passively generate discrete signals based on a single signal. The discrete signals may be identical in form and/or content or may suitably differ. In one embodiment, each optical coupler 402 is a coupler operable to tap the connected link and provide an optical signal of between 1–5% of the tapped signal from the link to the corresponding photodetector 404.

Photodetectors 404 are each operable to receive and measure the provided optical signal and to generate a power signal based on the optical signal. The power signal indicates or is indicative of the power of the optical signal on the corresponding link 414.

Optical pump 406 is operable to receive pump control signals from the AGC circuitry 412 and generate a pump energy signal based on the pump control signals. Optical pump 406 may be a continuous wave laser or other suitable energy source operable to provide electromagnetic energy capable of amplifying an optical signal.

Gain medium 408 is operable to receive an optical signal and pump energy signal and amplify the optical signal with the pump energy signal. Gain medium 48 may comprise, for example, erbium (Er) doped fiber to suitably transfer pump energy to an optical transport signal comprising one or more traffic channels. Gain medium 408 may, in a particular embodiment, have a length of between 5 and 100 meters or other suitable lengths.

AGC circuitry 412 is operable to receive and measure the input power signal from input monitor 418 and to receive and measure the output power output monitor 420. Based on the input and output power signals, AGC circuitry 412 determines a desired pump power of pump 406 necessary to provide a specified gain for the optical transport signal.

AGC circuitry 412 is also operable to transmit the desired pump power of pump 406 to tuning circuitry of secondary amplifiers controlled by primary amplifier, such as gain tuning circuitry and power ratio tuning circuitry. As described above with respect to FIG. 3, the tuning circuitry of the secondary amplifiers compensates for the differences in the desired gain and power ratio for the secondary amplifiers as compared to the primary amplifier.

AGC circuitry 412, as well as other suitable components of optical amplifier 400, may comprise analog circuitry, digital circuitry embedded on a chip or other suitable circuitry. AGC circuitry 412 may also comprise logic embedded in media. The logic comprises functional instructions for carrying out programmed tasks. The media comprises computer disks or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized.

In operation, an optical signal to be amplified is received at an input or ingress side of optical amplifier 400 along optical link 413 and is split into two signals at optical coupler 402a of input monitor 418. One part of the split signal passes to optical coupler 402c where a pump energy signal received from pump 406 is added. The combined signal travels through gain medium 408 where the signal is amplified. The amplified signal proceeds to filter 410 and to optical coupler 402b of output monitor 420 where it is again split into two components. A first component travels along egress optical link 415 out of optical amplifier 400 and continues through the network to the intended destination.

Returning to input monitor 418, the input photodetector 404a receives the second part of the split signal provided by optical coupler 402a, measures an input power of the signal and generates an input power signal based on that power. The input power signal is transmitted along electrical link 416 to AGC circuitry 412. Similarly, in output monitor 420, the split signal travels along an optical link 414 to output photodetector 404b. At photodetector 404b, an output power of the signal is measured and an output power signal is generated based on such output power. The output power signal is transmitted along electrical link 416 to AGC circuitry 412.

AGC circuitry 412 receives the input power signal and determines nominal pump power, which is an approximation of the pump power to achieve the specified or desired gain in amplifier 400 based on the input power as communicated by input monitor 418. The determination may be based on a strictly linear relationship between input power and pump power, a monotonic relationship between input power and pimp power, other suitable relationship or any other suitable algorithm based on the network and amplifier configuration. In particular embodiments, the determination may include an aging factor to compensate for pump degradation. A nominal pump control signal is generated by AGC circuitry 412 instructing pump 406 to generate a pump energy signal based on the determined pump power required. The pump control signal may comprise an electrical current at which pump 400 is to operate to generate the determined pump power. It will be understood that the pump control signal may otherwise suitably indicate to the pump the nominal pump power determined by AGC circuitry 412. The nominal pump control signal, as well as other power and/or control signals, may be any analog, digital, electrical or other suitable types of signals.

AGC circuitry 412 receives the output power signals generated by output monitor 420 and determines an actual gain of the amplifier by, for example, comparing the power signals received from monitors 418 and 420, resulting in an actual gain. Generally, gain is the ratio of output power to input power. The actual gain is compared to a desired gain and a feedback pump control signal may be generated based on the comparison. For example, if the actual gain is lower than the desired gain a feedback pump control signal is generated and transmitted to pump 406 increasing the pump power of pump 406 to increase the gain. Likewise, if the actual gain is higher than the desired gain, a feedback pump control signal is generated and transmitted to pump 406 directing pump 406 to decrease the pump power. Thus, the feedback pump control signal may indicate a positive or negative adjustment to pump power rather than a specified pump power. The specified change in pump power may be in terms of a change in electrical current at which pump 406 operates. AGC circuitry 412 may operate continually, perpetually and/or intermittently to control pump 406 to provide a specified amplification (gain) of amplifier 400 based on the changing input power and output power of the optical transport signal.

While particular components are illustrated for primary amplifier 400, it should be understood that use of a primary amplifier to control one or more secondary amplifiers may eliminate the need for some of these components in a secondary amplifier. For example, secondary amplifiers in particular embodiments may not utilize couplers, photodetectors and filters. Moreover, less complex circuitry may be used in a secondary amplifier than the AGC circuitry that may be needed in a primary amplifier. Such less complex circuitry may include gain tuning and power ratio tuning circuitry as discussed above. Since the need for certain components in a secondary amplifier is eliminated and since simpler circuitry may be used in the secondary amplifier, costs can be saved in the implementation of secondary amplifiers controlled by a primary amplifier in an optical network.

Figure 5:
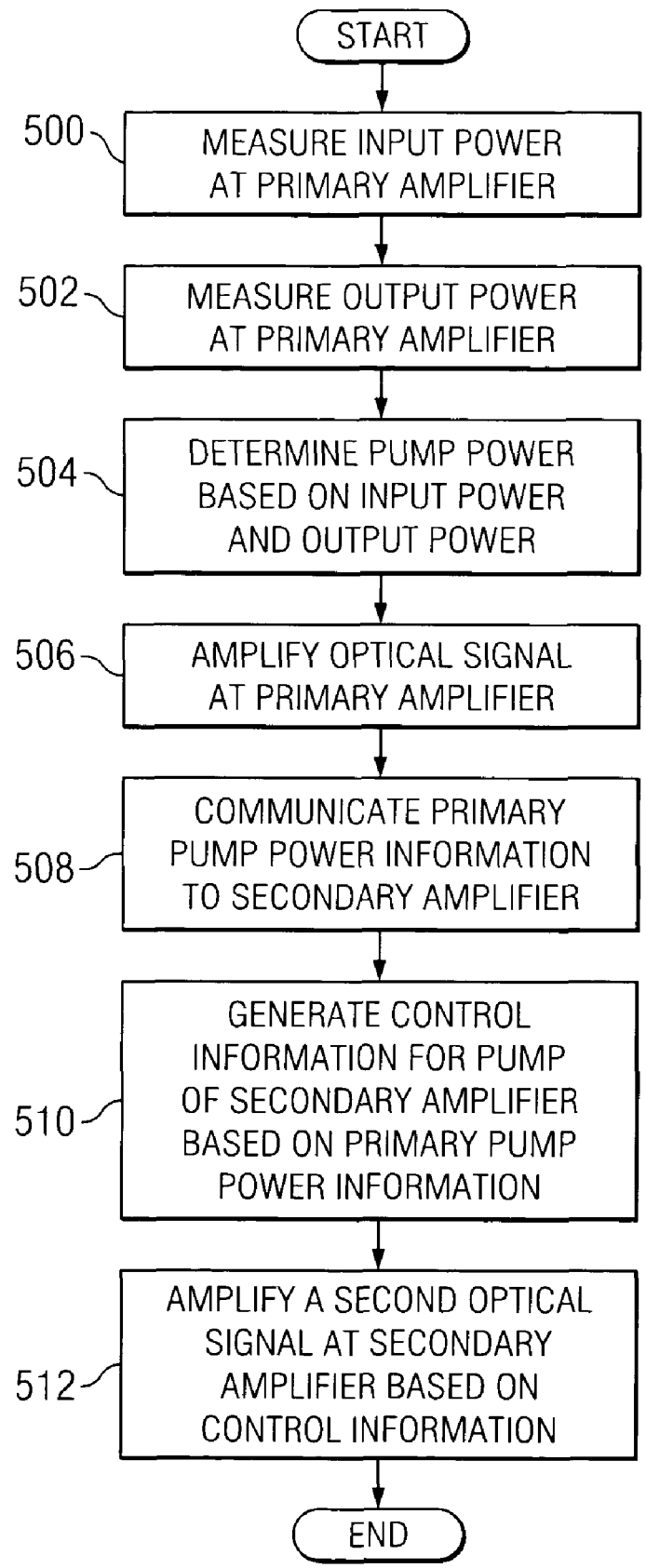
FIG. 5 illustrates a method for controlling an amplifier in an optical network, in accordance with a particular embodiment of the present invention.

FIG. 5 is a flowchart illustrating a method for controlling an amplifier in an optical network, in accordance with a particular embodiment of the present invention. The method begins at step 500 where an input power of an optical signal is measured at a primary amplifier. At step 502, an output power of the optical signal is measured at the primary amplifier. At step 504, pump power for the primary amplifier is determined based on the input power and the output power.

At step 506, an optical signal is amplified at the primary amplifier. Such amplification may be accomplished by a pump and gain medium of the primary amplifier. At step 508, pump power information of the primary amplifier is communicated to a secondary amplifier coupled to the primary amplifier. At step 510, control information for a pump of the secondary amplifier is generated based on the pump power information of the primary amplifier. Such control information may be generated by adjusting parameters of the primary pump power information. Such adjustment may include adjusting for a difference in relative gains of the primary amplifier and secondary amplifier and adjusting for a difference in relative power ratio of the primary amplifier and the secondary amplifier. At step 512, an optical signal is amplified at the secondary amplifier based on the control information generated for the pump of the secondary amplifier. In particular embodiments, the optical signals amplified at the primary and secondary amplifiers may comprise the same optical channels. The primary amplifier may be a pre-amplifier of an optical node, and the secondary amplifier may be a distributing amplifier of an optical node.

Some of the steps illustrated in FIG. 5 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within nodes and amplifiers, these elements may be combined, rearranged or positioned in order to accommodate particular routing architectures or needs. In addition, any of these elements may be provided as separate external components to such nodes or amplifiers or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for controlling an amplifier in an optical network, comprising:
   determining primary pump power information for a primary amplifier;
      communicating the primary pump power information to a secondary amplifier coupled to the primary amplifier;
      generating secondary pump control information for the secondary amplifier based on the primary pump power information, wherein generating secondary pump control information comprises adjusting parameters of the primary pump power information for one or both of a difference in relative gains of the primary amplifier and secondary amplifier and a difference in relative power ratio of the primary amplifier and the secondary amplifier; and
      amplifying a first optical signal at the secondary amplifier based on the secondary pump control information.

2. The method of claim 1, further comprising amplifying a second optical signal at the primary amplifier, wherein the first optical signal and the second optical signal comprise the same channels.

3. The method of claim 2, further comprising:
   measuring an input power of the second optical signal at the primary amplifier;
   measuring an output power of the second third optical signal at the primary amplifier; and
   wherein determining primary pump power information for a primary amplifier comprises determining primary pump power information based on the input power and the output power.

4. The method of claim 1, wherein:
   the primary amplifier comprises a pre-amplifier of an optical node; and
   the secondary amplifier comprises a distributing amplifier of the optical node.

5. The method of claim 1, wherein the primary amplifier and the secondary amplifier comprise erbium doped fiber amplifiers (EDFAs).

6. A system for controlling an amplifier in an optical network, comprising:
   a primary amplifier coupled to a secondary amplifier, the primary amplifier comprising automatic gain control circuitry operable to:
   determine primary pump power information for the primary amplifier; and
   communicate the primary pump power information to the secondary amplifier; and the secondary amplifier comprising:
   tuning circuitry operable to generate secondary pump control information for the secondary amplifier based on the primary pump power information, wherein generating secondary pump control information comprises adjusting parameters of the primary pump power information for one or both of a difference in relative gains of the primary amplifier and secondary amplifier and a difference in relative power ratio of the primary amplifier and the secondary amplifier; and
   gain medium operable to amplify a first optical signal based on the secondary pump control information.

7. The system of claim 6, wherein the primary amplifier comprises gain medium operable to amplify a second optical signal, wherein the first optical signal and the second optical signal comprise the same channels.

8. The system of claim 7, wherein the primary amplifier further comprises:
   an input monitor operable to measure an input power of the second optical signal;
   an output monitor operable to measure an output power of the second optical signal; and
   wherein automatic gain control circuitry operable to determine primary pump power information comprises automatic gain control circuitry operable to determine primary pump power information based on the input power and the output power.

9. The system of claim 6, wherein:
   the primary amplifier comprises a pre-amplifier of an optical node; and
   the secondary amplifier comprises a distributing amplifier of the optical node.

10. The system of claim 6, wherein the primary amplifier and the secondary amplifier comprise erbium doped fiber amplifiers (EDFAs).

11. A system for controlling an amplifier in an optical network, comprising:
   means for determining primary pump power information for a primary amplifier;
   means for communicating the primary pump power information to a secondary amplifier coupled to the primary amplifier;
   means for generating secondary pump control information for the secondary amplifier based on the primary pump power information, wherein generating secondary pump control information comprises adjusting parameters of the primary pump power information for one or both of a difference in relative gains of the primary amplifier and secondary amplifier and a difference in relative power ratio of the primary amplifier and the secondary amplifier; and
   means for amplifying a first optical signal at the secondary amplifier based on the secondary pump control information.

12. The system of claim 11, further comprising means for amplifying a second optical signal at the primary amplifier, wherein the first optical signal and the second optical signal comprise the same channels.

* * * * *

UNITED STATES PATENT AND TRADEMARK OFFICE
CERTIFICATE OF CORRECTION

| | | |
|---|---|---|
| PATENT NO. | : 7,057,149 B2 | Page 1 of 1 |
| APPLICATION NO. | : 10/648941 | |
| DATED | : June 6, 2006 | |
| INVENTOR(S) | : Cechan Tian et al. | |

It is certified that error appears in the above-identified patent and that said Letters Patent is hereby corrected as shown below:

Column 2, Line 7, after "secondary amplifier" insert --.--.
Column 8, Line 59, after "Gain medium" delete "48" and insert --408--.
Column 9, Line 54, delete "pimp" and insert --pump--.

Signed and Sealed this

Twenty-ninth Day of July, 2008

JON W. DUDAS
*Director of the United States Patent and Trademark Office*